(12) United States Patent
Dambal et al.

(10) Patent No.: US 11,989,301 B2
(45) Date of Patent: May 21, 2024

(54) SYSTEM AND METHOD OF CONFIGURING A NON-VOLATILE STORAGE DEVICE (71) Applicant: Dell Products L.P., Round Rock, TX (US)

(72) Inventors: Sanjeev Surendra Dambal, Austin, TX (US); Sanjay Rao, Round Rock, TX (US); Charles D. Stracener, Carrollton, TX (US); Diwahar Natarajan, Austin, TX (US); Vigneswaran Ponnusamy, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 367 days.

(21) Appl. No.: 17/449,181

(22) Filed: Sep. 28, 2021

(65) Prior Publication Data

US 2023/0100958 A1 Mar. 30, 2023

(51) Int. Cl.
*G06F 21/57* (2013.01)
*G06F 9/445* (2018.01)
*G06F 9/54* (2006.01)
*G06F 11/22* (2006.01)

(52) U.S. Cl.
CPC .......... *G06F 21/572* (2013.01); *G06F 9/445* (2013.01); *G06F 9/544* (2013.01); *G06F 11/2284* (2013.01); *G06F 2221/2107* (2013.01); *G06F 2221/2143* (2013.01)

(58) Field of Classification Search
None
See application file for complete search history.

(56) References Cited

U.S. PATENT DOCUMENTS

| 10,706,153 B2* | 7/2020 | Khatri | G06F 21/602 |
| 2017/0085374 A1* | 3/2017 | Chen | H04L 9/083 |
| 2021/0264055 A1* | 8/2021 | Subramanian | G06F 21/575 |

* cited by examiner

*Primary Examiner* — Shirley X Zhang
(74) *Attorney, Agent, or Firm* — McDermott Will & Emery LLP (57) ABSTRACT

In one or more embodiments, one or more systems, one or more methods, and/or one or more processes may determine that the staged job needs to be executed by a baseboard management controller (BMC) while an information handling system (IHS) is held in a power-on self-test; create a hybrid job associated with the staged job; reboot the IHS; launch an IHS firmware application in a pre-boot IHS firmware environment; provide, to the BMC, a command to execute a first portion of the hybrid job; obtain, by the BMC, an authentication key; provide, by the BMC, the authentication key to the non-volatile storage device; execute, by the BMC, the first portion of the hybrid job to configure the non-volatile storage device; and execute, by the IHS firmware application, the second portion of the hybrid job to poll the baseboard management controller for a result status of configuring the non-volatile storage device.

20 Claims, 5 Drawing Sheets

SYSTEM AND METHOD OF CONFIGURING A NON-VOLATILE STORAGE DEVICE

BACKGROUND

Field of the Disclosure

This disclosure relates generally to information handling systems and more particularly to configuring a non-volatile storage device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may create a staged job associated with configuring a non-volatile storage device; may determine that the staged job needs to be executed by a baseboard management controller of an information handling system while the information handling system is held in a power-on self-test; may, in response to determining that the staged job needs to be executed by the baseboard management controller while the information handling system is held in a power-on self-test, create a hybrid job, which includes a first portion for the baseboard management controller and a second portion for information handling system firmware, associated with the staged job; may reboot the information handling system; may, after rebooting the information handling system, launch an information handling system firmware application in a pre-boot an information handling system firmware environment; may determine that the hybrid job is to be executed; may provide, to the baseboard management controller, a shared memory access command to execute the first portion of the hybrid job; may obtain an authentication key; may provide the authentication key to the non-volatile storage device; may execute the first portion of the hybrid job to configure the non-volatile storage device; and may execute the second portion of the hybrid job to poll the baseboard management controller for a result status of configuring the non-volatile storage device.

In one or more embodiments, obtaining the authentication key may include obtaining the authentication key from another information handling system via a network. In one or more embodiments, the baseboard management controller may include a non-volatile memory medium that stores the authentication key. For example, obtaining the authentication key may include retrieving the authentication key from the non-volatile memory medium. In one or more embodiments, the non-volatile storage device may be a non-volatile memory express self-encrypting drive, a RAID controller, a SAS controller, or a host bus adapter.

In one or more embodiments, the one or more systems, the one or more methods, and/or the one or more processes may further: receive the result status of configuring the non-volatile storage device; determine that the information handling system can boot an operating system based at least on the result status of the configuring the non-volatile storage device; and boot the operating system. In one or more embodiments, the information handling system firmware application may be a Unified Extensible Firmware Interface application that executes in a Unified Extensible Firmware Interface environment. In one or more embodiments, configuring the non-volatile storage device may include cryptographically erasing the non-volatile storage device or updating firmware of the non-volatile storage device.

In one or more embodiments, a baseboard management controller may be configured to: determine that a staged job associated with configuring a non-volatile storage device needs to be executed by a hybrid job associated with the staged job while an information handling system is held in a power-on self-test; in response to determining that the staged job needs to be executed by the hybrid job while the information handling system is held in a power-on self-test, create the hybrid job, which includes a first portion for the baseboard management controller and a second portion for information handling system firmware of the information handling system; reboot the information handling system; receive, from an information handling system firmware application, a shared memory access command to execute the first portion of the hybrid job; obtain an authentication key; provide the authentication key to the non-volatile storage device; execute the first portion of the hybrid job to configure the non-volatile storage device; and provide the result status of configuring the non-volatile storage device to the information handling system firmware application.

In one or more embodiments, to obtain the authentication key, the baseboard management controller may be further configured to obtain the authentication key from another information handling system via a network. In one or more embodiments, the baseboard management controller may include a non-volatile memory medium that stores the authentication key. For example, to obtain the authentication key, the baseboard management controller may be further configured to retrieve the authentication key from the non-volatile memory medium. In one or more embodiments, the non-volatile storage device may be a non-volatile memory express self-encrypting drive, a RAID controller, a SAS controller, or a host bus adapter. In one or more embodiments, to configure the non-volatile storage device, the baseboard management controller may be further configured to cryptographically erase the non-volatile storage device or update firmware of the non-volatile storage device. In one or more embodiments, the baseboard management controller may be further configured to receive, from a user, a command to configure the non-volatile storage device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include a non-volatile memory express (NVMe) self-encrypting drive (SED). For example, a NVMe SED may support a Trusted Computing Group (TCG) security protocol. For instance, the TCG security protocol may be of a class Opal, among others. As an example, the TCG security protocol may permit entities to secure a NVMe SED. In one or more embodiments, the information handling system may be communicatively coupled to a NVMe SED. For example, the NVMe SED may be external to the information handling system. In one or more embodiments, after a NVMe SED is secured, the NVMe SED may only be erased by issuing one or more TCG security commands. For example, after a NVMe SED is secured, the NVMe SED may only be erased by issuing one or more TCG Opal security commands.

In one or more embodiments, a cryptographic erase of a non-SED NVMe drive may be performed by information handling system firmware utilizing one or more NVMe management interface (NVMe-MI) commands in a pre-boot information handling system firmware environment. For example, the pre-boot information handling system firmware environment may include a pre-boot Unified Extensible Firmware Interface (UEFI) environment. In one or more embodiments, the information handling system firmware may implement the TCG security commands (e.g., the TCG Opal security commands). For example, the information handling system firmware may access an authentication key to issue the security commands to the NVMe SED. For instance, the information handling system firmware may access the authentication key from a baseboard management controller.

In one or more embodiments, a baseboard management controller may implement the TCG security protocol. For example, the baseboard management controller may implement the TCG Opal security protocol. In one or more embodiments, the baseboard management controller may utilize the TCG security protocol to secure a NVMe SED. For example, the baseboard management controller may utilize the TCG Opal security protocol to secure a NVMe SED. In one or more embodiments, securing a NVMe SED from the baseboard management controller may be more secure than the information handling system firmware accessing the authentication key from the baseboard management controller and securing the NVMe SED. For example, in this fashion, reducing communicating the authentication key may provide greater security.

In one or more embodiments, the baseboard management controller may perform a cryptographic erase process on a NVMe SED. For example, the baseboard management controller may perform a cryptographic erase process on a NVMe SED, since the baseboard management controller may implement the TCG security protocol (e.g., the TCG Opal security protocol) and may have access to an authentication key for the NVMe SED. In one or more embodiments, the NVMe SED should not be in use by a host operating system and/or an application executing in a host operating system environment of the host operating system while the baseboard management controller is performing the cryptographic erase process on the NVMe SED. For example, using the NVMe SED by the host operating system and/or the application executing in the host operating system environment of the host operating system while the baseboard management controller is performing the cryptographic erase process on the NVMe SED may result in wayward behavior. For instance, the wayward behavior may include crashing the application and/or crashing the host operating system, among others.

In one or more embodiments, a hybrid job may be utilized to cryptographic erase a NVMe SED. For example, a hybrid job may include configuration jobs that are created by a user (e.g., an administrator) as staged jobs, which may be executed on a baseboard management controller while holding an information handling system in a power-on self-test (POST). In one or more embodiments, this may ensure that the baseboard management controller can safely issue commands (e.g., TCG security commands, TCG Opal security commands, etc.) to a NVMe SED while the NVMe SED is not being utilized by a host operating system and/or an application executing in the host operating system environment of the host operating system. In one or more embodiments, a user (e.g., an administrator) may create a staged configuration job. For example, the staged configuration job may include a cryptographic erase process of a NVMe SED.

In one or more embodiments, a baseboard management controller may determine if the configuration job needs to be executed on the baseboard management controller while the information handling system needs to be held in a POST. If not, the existing staged configuration job may be created and executed. If so, the baseboard management controller may create a hybrid job and reboot the information handling system. In one or more embodiments, when an information handling system firmware application is launched in a pre-boot information handling system firmware environment, the information handling system firmware application may determine that the configuration job to be executed is a hybrid job and may provide a shared memory access (SMA) command to the baseboard management controller along with a job identification (JID). For example, when a UEFI application is launched in a pre-boot UEFI environment, the UEFI application may determine that the configuration job to be executed is a hybrid job and may provide a SMA command to the baseboard management controller along with JID.

In one or more embodiments, the information handling system firmware application may poll the baseboard management controller for a completion status of the job and may utilize a predefined timeout value to poll the baseboard management controller. For example, the UEFI application may poll the baseboard management controller for a completion status of the job and may utilize a predefined timeout value to poll the baseboard management controller. In one or more embodiments, the baseboard management controller may process the SMA command and may execute the job. For example, the baseboard management controller may cryptographic erase the NVMe SED. For instance, the baseboard management controller may cryptographic erase the NVMe SED with an assurance that the NVMe SED is not being used by a host operating system and/or an application executing in the host operating system environment of the host operating system.

In one or more embodiments, after the configuration job is completed, the baseboard management controller may respond to the polling for the completion status of the job with an appropriate job status. For example, the baseboard management controller may respond to the information handling system firmware application with an appropriate job status. For instance, the baseboard management controller may respond to the UEFI application with an appropriate job status. In one or more embodiments, the information handling system firmware application may timeout or may receive the job status from the baseboard management controller and then may continue with other configuration jobs. For example, the UEFI application may timeout or may receive the job status from the baseboard management controller and then may continue with other configuration jobs. In one or more embodiments, existing lifecycle (LC) logs and/or configuration results may be updated.

Figure 1A:
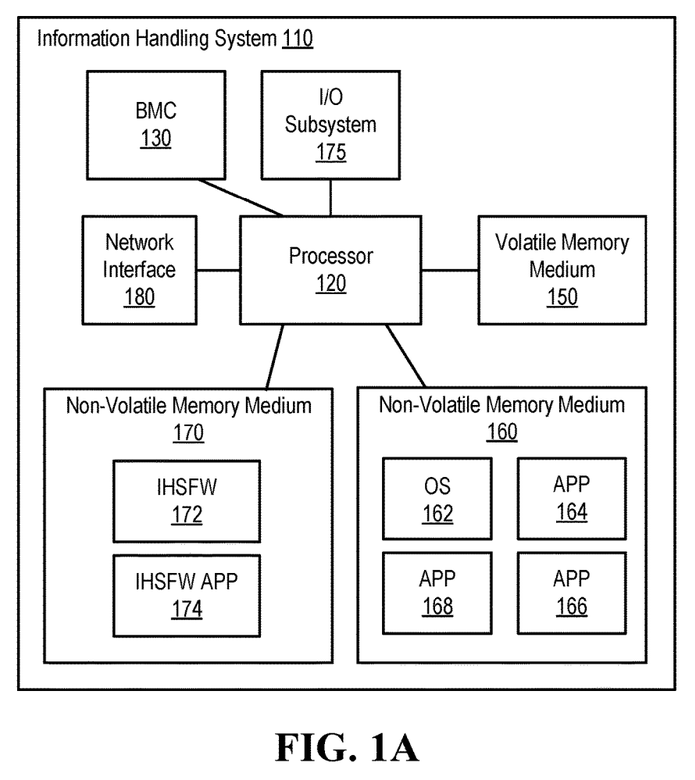
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O BMC 130, subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. For example, OS 162 may be a host operating system. For instance, OS 162 may be or may include a MICROSOFT® WINDOWS® operating system, a MacOS operating system, a UNIX® operating system, a Unix-like operating system, among others. As an example, the Unix-like operating system may be or include LINUX®, FREEBSD®, NETBSD®, OpenBSD, Minix, Xinu, or Darwin, among others. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a UEFI, and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, non-volatile memory medium 170 may include an IHSFW application (APP) 174. For example, IHSFW APP 174 may be or may include a UEFI APP. For instance, IHSFW APP 174 may execute in a UEFI environment. As an example, IHSFW APP 174 may execute during a POST of IHS 110. For instance, IHSFW APP 174 may execute before booting OS 162.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein. In one or more embodiments, BMC 130 may be an embedded controller.

Figure 1B:
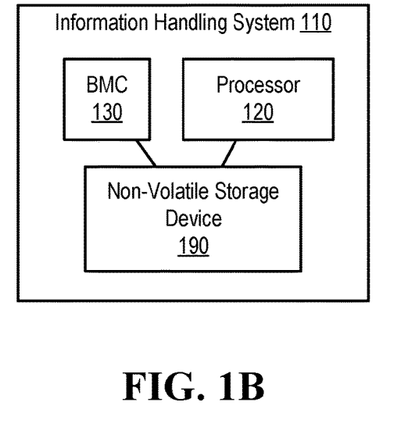
FIGS. 1B and 1C illustrate examples of a non-volatile storage device utilized with an information handling system, according to one or more embodiments.
Figure 1C:
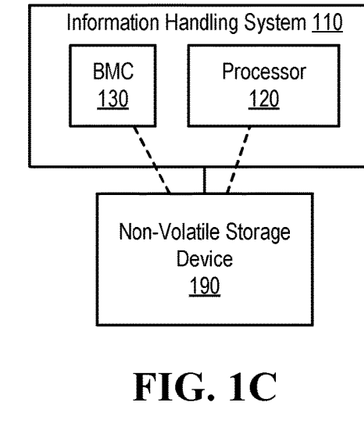

Turning now to FIGS. 1B and 1C, examples of a non-volatile storage device utilized with an information handling system are illustrated, according to one or more embodiments. In one or more embodiments, IHS 110 may include a non-volatile storage device 190, as illustrated in FIG. 1B. For example, non-volatile storage device 190 may be communicatively coupled to one or more of processor 120 and BMC 130, among others. In one or more embodiments, non-volatile storage device 190 may be external to IHS 110, as illustrated in FIG. 1C. For example, non-volatile storage device 190 may be communicatively coupled to IHS 110. For instance, non-volatile storage device 190 may be communicatively coupled to one or more of processor 120 and BMC 130, among others.

Figure 2:
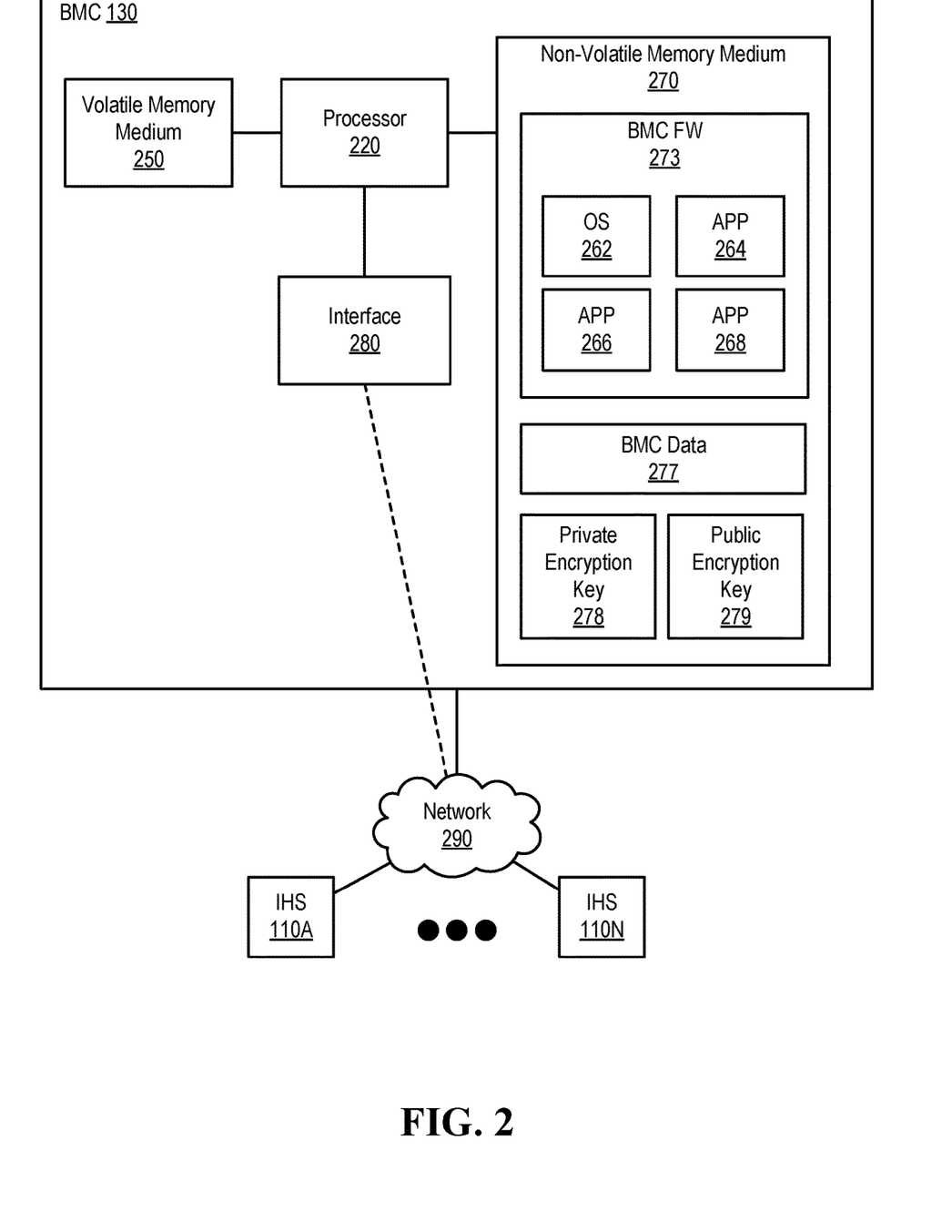
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEB SD®, NETB SD®, OpenB SD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 may be different from public encryption key 279. For example, private encryption key 278 and public encryption key 279 may be asymmetric encryption keys. In one instance, data encrypted via private encryption key 278 may be decrypted via public encryption key 279. In another instance, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

In one or more embodiments, BMC 130 may be communicatively coupled to a network 290. For example, interface 280 may be communicatively coupled to network 290. In one or more embodiments, processor 220 may be communicatively coupled to network 290. For example, processor 220 may be communicatively coupled to network 290 via interface 280. In one or more embodiments, network 290 may include a wired network, a wireless network, an optical network, or a combination of the foregoing, among others. For example, network 290 may include and/or be coupled to various types of communications networks. For instance, network 290 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, information handling systems (IHSs) 110A-110N may be communicatively coupled to network 290. In one or more embodiments, BMC 130 may obtain an authentication key via network 290. For example, BMC 130 may obtain an authentication key from an information handling system of IHSs 110A-110N via network 290. Although FIG. 2 illustrates IHSs 110A-110N communicatively coupled to network 290, any number of IHSs 110 may be coupled to network 290, according to one or more embodiments.

Figure 3:
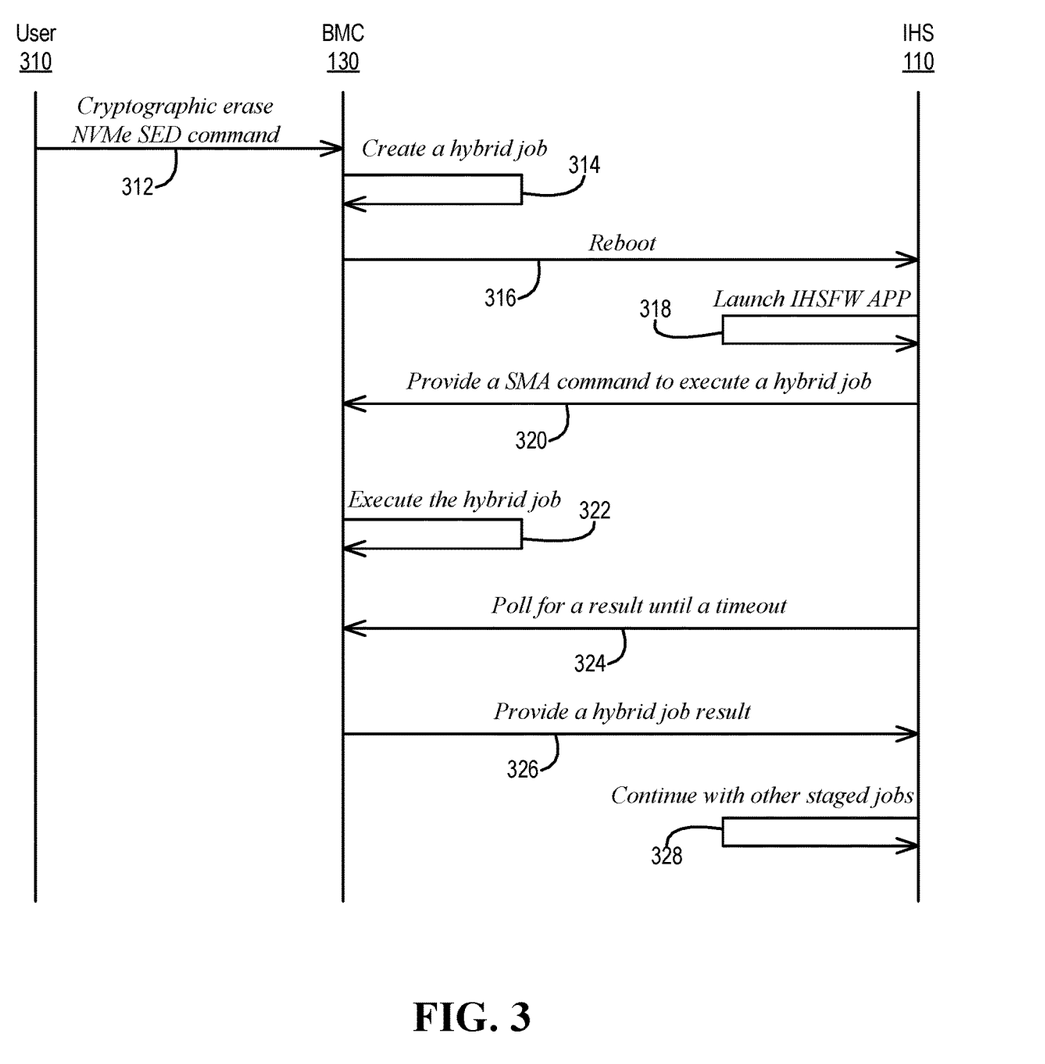
FIG. 3 illustrates an example of a sequence diagram, according to one or more embodiments.

Turning now to FIG. 3, an example of a sequence diagram is illustrated, according to one or more embodiments. At 312, a user 310 (e.g., an administrator) may provide a cryptographic erase NVMe SED command to BMC 130. At 314, BMC 130 may create a hybrid job. At 316, BMC 130 may reboot IHS 110. At 318, IHS 110 may launch an IHSFW APP. For example, IHS 110 may launch IHSFW APP 174. For instance, IHSFW APP 174 may be or may include a UEFI APP. As an example, IHSFW APP 174 may execute in a UEFI environment. For instance, IHSFW APP 174 may execute during a POST of IHS 110. At 320, IHS 110 may provide, to BMC 130, a SMA command to execute a hybrid job. For example, IHSFW APP 174 may provide, to BMC 130, the SMA command to execute the hybrid job. At 322, BMC 130 may execute the hybrid job. At 324, IHS 110 may poll BMC 130 for a result until a timeout is reached. At 326, BMC 130 may provide a hybrid job result to IHS 110. For example, BMC 130 may provide a hybrid job result to IHSFW APP 174. At 328, IHS 110 may continue with other staged jobs.

Figure 4:
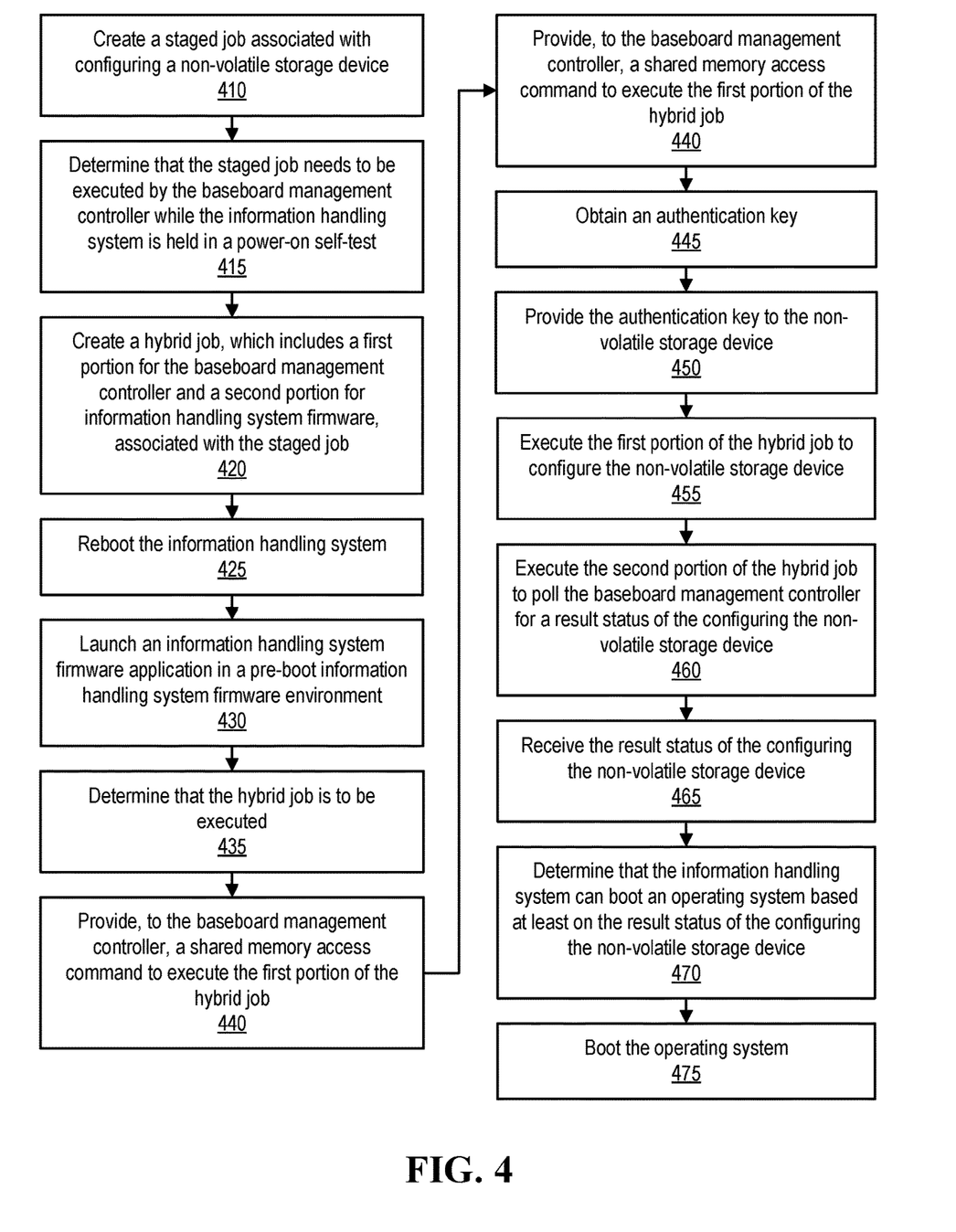
FIG. 4 illustrates an example of a method of operating an information handling system, according to one or more embodiments.

Turning now to FIG. 4, an example of a method of operating an information handling system is illustrated, according to one or more embodiments. At 410, a staged job associated with configuring a non-volatile storage device may be created. For example, IHS 110 may create a staged job associated with configuring a non-volatile storage device 190. For instance, IHSFW 172 may create a staged job associated with configuring a non-volatile storage device 190. In one or more embodiments, the non-volatile storage device may be a non-volatile memory express self-encrypting drive, a RAID (redundant array of independent disks) controller, a SAS (serial attached SCSI (small computer system interface)) controller, or a host bus adapter, among others. In one or more embodiments, configuring the non-volatile storage device may include cryptographically erasing the non-volatile storage device or updating firmware of the non-volatile storage device. In one or more embodiments, configuring the non-volatile storage device may include providing one or more commands to the non-volatile storage device.

At 415, it may be determined that the staged job needs to be executed by a baseboard management controller of an information handling system while the information handling system is held in a power-on self-test. For example, BMC 130 may determine that the staged job needs to be executed by BMC 130 while IHS 110 is held in a power-on self-test. At 420, a hybrid job, which includes a first portion for the baseboard management controller and a second portion for information handling system firmware, associated with the staged job may be created. For example, BMC 130 may create a hybrid job, which includes a first portion for BMC 130 and a second portion for IHSFW 172, associated with the staged job. In one or more embodiments, creating the hybrid job may be performed in response to determining that the staged job needs to be executed by the baseboard management controller of while the information handling system is held in the power-on self-test.

At 425, the information handling system may be rebooted. For example, BMC 130 may reboot IHS 110. At 430, after rebooting the information handling system, an information handling system firmware application may be launched in a pre-boot information handling system firmware environment. For example, after rebooting IHS 110, IHS 110 may launch an IHSFW APP 174 in a pre-boot information handling system firmware environment. For instance, IHSFW 172 may launch IHSFW APP 174 in a pre-boot information handling system firmware environment. As an example, IHSFW APP 174 may be a UEFI application. For instance, the pre-boot information handling system firmware environment may be a UEFI environment. In one or more embodiments, pre-boot may refer to before booting a host operating system (e.g., OS 162).

At 435, it may be determined that the hybrid job is to be executed. For example, IHSFW APP 174 may determine that the hybrid job is to be executed. At 440, a shared memory access command may be provided to the baseboard management controller to execute the first portion of the hybrid job. For example, IHSFW APP 174 may provide, to BMC 130, a shared memory access command to execute the first portion of the hybrid job.

At 445, an authentication key may be obtained. For example, BMC 130 may obtain an authentication key. For instance, BMC 130 may obtain the authentication key from another information handling system (e.g., one of IHSs 110A-110N) via network 290. In one or more embodiments, BMC 130 may store the authentication key via a memory medium of BMC 130. For example, BMC 130 may store the authentication key via non-volatile memory medium 270. For instance, BMC 130 may obtain the authentication key from non-volatile memory medium 270. As an example, obtaining the authentication key from non-volatile memory medium 270 may include retrieving the authentication key from non-volatile memory medium 270. In one or more embodiments, the authentication key may be utilized to provide one or more commands to the non-volatile storage device. For example, BMC 130 may utilize the authentication key to provide one or more commands to non-volatile storage device 190.

At 450, the authentication key may be provided to the non-volatile storage device. For example, BMC 130 may provide authentication key to the non-volatile storage device 190. At 455, the first portion of the hybrid job may be executed to configure the non-volatile storage device. For example, BMC 130 may execute the first portion of the hybrid job to configure non-volatile storage device 190. At 460, the second portion of the hybrid job may be executed to poll the baseboard management controller for a result status of configuring the non-volatile storage device. For example, IHSFW APP 174 may execute the second portion of the hybrid job to poll BMC 130 for a result status of configuring non-volatile storage device 190.

At 465, the result status of configuring the non-volatile storage device may be received. For example, IHSFW APP 174 may receive the result status of configuring the non-volatile storage device 190. For instance, IHSFW APP 174 may receive, from BMC 130, the result status of configuring the non-volatile storage device 190. At 470, it may be determined that the information handling system can boot an operating system based at least on the result status of the configuring the non-volatile storage device. For example, IHSFW APP 174 may determine that IHS 110 can boot OS 162 based at least on the result status of configuring non-volatile storage device 190. At 475, the operating system may be booted. For example, OS 162 may be booted. For instance, IHSFW 172 may boot OS 162.

Figure 5:
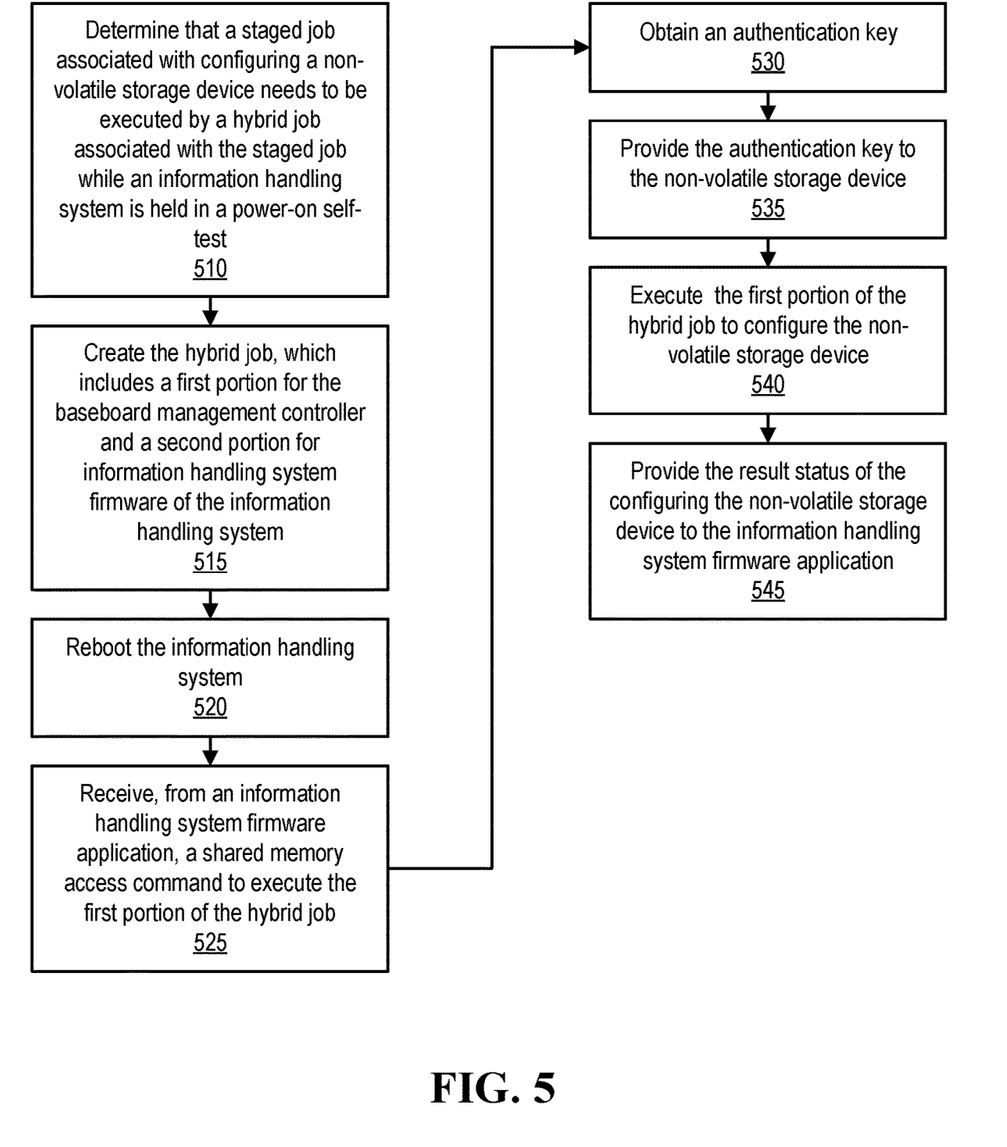
FIG. 5 illustrates an example of operating a baseboard management controller, according to one or more embodiments.

Turning now to FIG. 5, an example of operating a baseboard management controller is illustrated, according to one or more embodiments. At 510, it may be determined that a staged job associated with configuring a non-volatile storage device needs to be executed by a hybrid job associated with the staged job while an information handling system is held in a power-on self-test. For example, BMC 130 may determine that a staged job associated with configuring non-volatile storage device 190 needs to be executed by a hybrid job associated with the staged job while IHS 110 is held in a power-on self-test. In one or more embodiments, the non-volatile storage device may be a non-volatile memory express self-encrypting drive, a RAID controller, a SAS controller, or a host bus adapter, among others. In one or more embodiments, configuring the non-volatile storage device may include cryptographically erasing the non-volatile storage device or updating firmware of the non-volatile storage device. For example, configuring the non-volatile storage device may include providing one or more commands to the non-volatile storage device. In one or more embodiments, BMC 130 may receive, from a user (e.g., an administrator), a command to configure non-volatile storage device 190.

At 515, the hybrid job, which includes a first portion for the baseboard management controller and a second portion for information handling system firmware of the information handling system may be created. For example, BMC 130 may create the hybrid job, which includes a first portion for BMC 130 and a second portion for IHSFW 172 of IHS 110. For instance, BMC 130 may create the hybrid job, which includes a first portion for BMC 130 and a second portion for IHSFW 172 of IHS 110 in response to determining that the staged job needs to be executed by the hybrid job while IHS 110 is held in the power-on self-test.

At 520, the information handling system may be rebooted. For example, BMC 130 may reboot IHS 110. At 525, a shared memory access command to execute the first portion of the hybrid job may be received from an information handling system firmware application. For example, BMC 130 may receive, from IHSFW APP 174, a shared memory access command to execute the first portion of the hybrid job.

At 530, an authentication key may be obtained. For example, BMC 130 may obtain an authentication key. For instance, BMC 130 may obtain the authentication key from another information handling system (e.g., an information handling system of IHSs 110A-110N) via network 290. In one or more embodiments, BMC 130 may store the authentication key via a memory medium of BMC 130. For example, BMC 130 may store the authentication key via non-volatile memory medium 270. For instance, BMC 130 may obtain the authentication key from non-volatile memory medium 270. As an example, obtaining the authentication key from non-volatile memory medium 270 may include retrieving the authentication key from non-volatile memory medium 270. In one or more embodiments, the authentication key may be utilized to provide one or more commands to the non-volatile storage device. For example, BMC 130 may utilize the authentication key to provide one or more commands to non-volatile storage device 190.

At 535, the authentication key may be provided to the non-volatile storage device. For example, BMC 130 may provide authentication key to non-volatile storage device 190. At 540, the first portion of the hybrid job may be executed to configure the non-volatile storage device. For example, BMC 130 may execute the first portion of the hybrid job to configure non-volatile storage device 190. At 545, the result status of configuring the non-volatile storage device may be provided to the information handling system firmware application. For example, BMC 130 may provide the result status of configuring non-volatile storage device 190 to IHSFW APP 174.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor;
a baseboard management controller coupled to the at least one processor; and
a memory medium, coupled to the at least one processor, that stores instructions executable by the at least one processor, which when executed by the at least one processor, cause the information handling system to:
create a staged job associated with configuring a non-volatile storage device;
wherein the baseboard management controller is configured to:
determine that engagement by a host operating system and/or application executing in a host operating system environment of the host operating system of the information handling system while concurrently configuring the non-volatile storage device results in crash of the host operating system;
prevent engagement by the host operating system and/or application executing in the host operating system environment of the host operating system of the information handling system, including determining that the staged job needs to be executed by the baseboard management controller while the information handling system is held in a power-on self-test;
in response to determining that the staged job needs to be executed by the baseboard management controller, create a hybrid job, which includes a first portion for the baseboard management controller and a second portion for information handling system firmware, associated with the staged job; and
reboot the information handling system;
wherein the instructions further cause the information handling system to:
after the rebooting the information handling system, launch an information handling system firmware application in a pre-boot information handling system firmware environment;
wherein the information handling system firmware application, which when executed by the at least one processor, causes the information handling system to:
determine that the hybrid job is to be executed; and
provide, to the baseboard management controller, a shared memory access command to execute the first portion of the hybrid job;
wherein the baseboard management controller is further configured to:
obtain an authentication key;
provide the authentication key to the non-volatile storage device; and
execute the first portion of the hybrid job to configure the non-volatile storage device; and
wherein the information handling system firmware application further causes the information handling system to:
execute the second portion of the hybrid job to poll the baseboard management controller for a result status of the configuring the non-volatile storage device.

2. The information handling system of claim 1, wherein, to obtain the authentication key, the baseboard management controller is further configured to obtain the authentication key from another information handling system via a network.

3. The information handling system of claim 1,
wherein the baseboard management controller includes a non-volatile memory medium that stores the authentication key; and
wherein, to obtain the authentication key, the baseboard management controller is further configured to retrieve the authentication key from the non-volatile memory medium.

4. The information handling system of claim 1, wherein the non-volatile storage device is a non-volatile memory express self-encrypting drive, a RAID controller, a SAS controller, or a host bus adapter.

5. The information handling system of claim 1,
wherein the information handling system firmware application further causes the information handling system to:
receive the result status of configuring the non-volatile storage device; and
determine that the information handling system can boot an operating system based at least on the result status of the configuring the non-volatile storage device; and
wherein the instructions further cause the information handling system to:
boot the operating system.

6. The information handling system of claim 1, wherein the information handling system firmware application is a Unified Extensible Firmware Interface application that executes in a Unified Extensible Firmware Interface environment.

7. The information handling system of claim 1, wherein, to configure the non-volatile storage device, the baseboard management controller is further configured to cryptographically erase the non-volatile storage device or update firmware of the non-volatile storage device.

8. A method, comprising:
creating, by an information handling system, a staged job associated with configuring a non-volatile storage device;
determining, by a baseboard management controller of the information handling system, that engagement by a host operating system and/or application executing in a host operating system environment of the host operating system of the information handling system while concurrently configuring the non-volatile storage device results in crash of the host operating system;
preventing engagement by the host operating system and/or application executing in the host operating system environment of the host operating system, including determining, by the baseboard management controller of the information handling system, that the staged job needs to be executed by the baseboard management controller while the information handling system is held in a power-on self-test;
in response to the determining that the staged job needs to be executed by the baseboard management controller while the information handling system is held in the power-on self-test, creating, by the baseboard management controller, a hybrid job, which includes a first portion for the baseboard management controller and a second portion for the information handling system firmware, associated with the staged job;
rebooting, by the baseboard management controller, the information handling system;
after the rebooting the information handling system, launching, by the information handling system, an information handling system firmware application in a pre-boot information handling system firmware environment;
determining, by the information handling system firmware application, that the hybrid job is to be executed;
providing, by the information handling system firmware application to the baseboard management controller, a shared memory access command to execute the first portion of the hybrid job;
obtaining, by the baseboard management controller, an authentication key;
providing, by the baseboard management controller, the authentication key to the non-volatile storage device;
executing, by the baseboard management controller, the first portion of the hybrid job to configure the non-volatile storage device; and
executing, by the information handling system firmware application, the second portion of the hybrid job to poll the baseboard management controller for a result status of the configuring the non-volatile storage device.

9. The method of claim 8, wherein the obtaining the authentication key includes obtaining the authentication key from another information handling system via a network.

10. The method of claim 8,
wherein the baseboard management controller includes a non-volatile memory medium that stores the authentication key; and
wherein the obtaining the authentication key includes retrieving the authentication key from the non-volatile memory medium.

11. The method of claim 8, wherein the non-volatile storage device is a non-volatile memory express self-encrypting drive, a RAID controller, a SAS controller, or a host bus adapter.

12. The method of claim 8, further comprising:
receiving, by the information handling system firmware application, the result status of the configuring the non-volatile storage device;
determining, by the information handling system firmware application, that the information handling system can boot an operating system based at least on the result status of the configuring the non-volatile storage device; and
booting, by the information handling system, the operating system.

13. The method of claim 8, wherein the information handling system firmware application is a Unified Extensible Firmware Interface application that executes in a Unified Extensible Firmware Interface environment.

14. The method of claim 8, wherein the configuring the non-volatile storage device includes cryptographically erasing the non-volatile storage device or updating firmware of the non-volatile storage device.

15. A baseboard management controller, comprising:
a processor; and
a memory medium, coupled to the processor, that stores instructions executable by the processor, which when executed by the processor, cause the baseboard management controller to:
create a staged job associated with configurating a non-volatile storage device
determine that engagement by a host operating system and/or application executing in a host operating system environment of the host operating system of an information handling system while concurrently configuring the non-volatile storage device results in crash of the host operating system;

preventing engagement by the host operating system and/or application executing in the host operating system environment of the host operating system, including determining that the staged job associated with configuring the non-volatile storage device needs to be executed by a hybrid job associated with the staged job while an information handling system is held in a power-on self-test;

in response to determining that the staged job needs to be executed by the hybrid job while the information handling system is held in a power-on self-test, create the hybrid job, which includes a first portion for the baseboard management controller and a second portion for information handling system firmware of the information handling system;

reboot the information handling system;

receive, from an information handling system firmware application, a shared memory access command to execute the first portion of the hybrid job;

obtain an authentication key;

provide the authentication key to the non-volatile storage device;

execute the first portion of the hybrid job to configure the non-volatile storage device; and provide the result status of configuring the non-volatile storage device to the information handling system firmware application.

16. The baseboard management controller of claim 15, wherein, to obtain the authentication key, the instructions further cause the baseboard management controller to obtain the authentication key from another information handling system via a network.

17. The baseboard management controller of claim 15, further comprising:

a non-volatile memory medium that stores the authentication key;

wherein, to obtain the authentication key, the instructions further cause the baseboard management controller to retrieve the authentication key from the non-volatile memory medium.

18. The baseboard management controller of claim 15, wherein the non-volatile storage device is a non-volatile memory express self-encrypting drive, a RAID controller, a SAS controller, or a host bus adapter.

19. The baseboard management controller of claim 15, wherein, to configure the non-volatile storage device, the instructions further cause the baseboard management controller to cryptographically erase the non-volatile storage device or update firmware of the non-volatile storage device.

20. The baseboard management controller of claim 15, wherein the instructions further cause the baseboard management controller to:

receive, from a user, a command to configure the non-volatile storage device.

* * * * *